US009695831B2

(12) United States Patent
Benim

(10) Patent No.: US 9,695,831 B2
(45) Date of Patent: Jul. 4, 2017

(54) DETECTION AND COUNTING OF SURGE CYCLES IN A COMPRESSOR

(71) Applicant: Woodward, Inc., Fort Collins, CO (US)

(72) Inventor: Alexander Benim, Katy, TX (US)

(73) Assignee: Woodward, Inc., Fort Collins, CO (US)

( * ) Notice: Subject to any disclaimer, the term of this patent is extended or adjusted under 35 U.S.C. 154(b) by 60 days.

(21) Appl. No.: 14/790,583

(22) Filed: Jul. 2, 2015

(65) Prior Publication Data

US 2017/0002820 A1 Jan. 5, 2017

(51) Int. Cl.

| | |
|---|---|
| ***G01N 7/20*** | (2006.01) |
| ***F04D 27/00*** | (2006.01) |
| ***F04D 27/02*** | (2006.01) |

(52) U.S. Cl.

CPC ........... *F04D 27/001* (2013.01); *F04D 27/02* (2013.01); *F05D 2260/80* (2013.01); *F05D 2270/101* (2013.01); *F05D 2270/303* (2013.01); *F05D 2270/304* (2013.01); *F05D 2270/3011* (2013.01); *F05D 2270/3013* (2013.01); *F05D 2270/3015* (2013.01); *F05D 2270/335* (2013.01)

(58) Field of Classification Search

CPC ...... F16K 37/0075; G01N 3/12; F02M 65/00; G01F 25/0007; G01L 27/00; G02P 21/00; G01M 15/042

USPC ...... 73/168, 37, 114.41, 114.51, 1, 16, 1.57, 73/1.01, 114.01

See application file for complete search history.

(56) References Cited

U.S. PATENT DOCUMENTS

| | | | | |
|---|---|---|---|---|
| 5,709,526 A * | 1/1998 | McLeister | F04D 27/0207 | 415/1 |
| 5,894,736 A * | 4/1999 | Beaverson | F04D 27/001 | 62/129 |
| 6,213,724 B1 * | 4/2001 | Haugen | F04D 27/02 | 417/18 |

(Continued)

FOREIGN PATENT DOCUMENTS

| | | |
|---|---|---|
| EP | 2765313 A1 | 8/2014 |
| WO | WO 97/38270 A1 | 10/1997 |

OTHER PUBLICATIONS

York, Methods and Apparatuses for Detecting Surge in Centrifugal Compressors, Oct. 16, 19997, WO 97/38270.*

(Continued)

*Primary Examiner* — Lisa Caputo
*Assistant Examiner* — Nigel Plumb
(74) *Attorney, Agent, or Firm* — Fish & Richardson P.C.

(57) ABSTRACT

The subject matter of this specification can be embodied in, among other things, a method that includes receiving one or more surge value parameters, selecting a first value from a selected parameter of the one of the parameters, determining a moving average, determining a rate of change, identifying a first phase of a surge cycle based on determining that the rate of change exceeds a threshold rate change, memorializing the first value, the moving average value, and a first time index, receiving a second value of the selected parameter, identifying a second phase of the surge cycle, receiving a third value of the selected parameter, identifying a third phase of the surge cycle, and providing an indication that one or more compressor surge cycles have occurred.

12 Claims, 6 Drawing Sheets

(56) References Cited

U.S. PATENT DOCUMENTS

| | | | | |
|---|---|---|---|---|
| 8,342,794 | B2 * | 1/2013 | Staroselsky | F04D 27/001 415/17 |
| 8,892,332 | B2 * | 11/2014 | Chi | F02D 28/00 60/605.2 |
| 2004/0193355 | A1 * | 9/2004 | Faymon | F04D 27/02 701/100 |
| 2012/0048387 | A1 * | 3/2012 | Galeotti | F04D 27/001 137/14 |
| 2014/0219820 | A1 * | 8/2014 | Koki | F04D 27/0223 417/19 |

OTHER PUBLICATIONS

International Search Report and Written Opinion of the International Searching Authority issued in International Application No. PCT/US2016/040132 on Sep. 19, 2016; 11 pages.

McMillan, "Centrifugal and Axial Compressor Control," Momentum Press. ISBN: 9781606501733, published in 2010, 164 pages.

* cited by examiner

DETECTION AND COUNTING OF SURGE CYCLES IN A COMPRESSOR

TECHNICAL FIELD

This instant specification relates to compressor protection systems.

BACKGROUND

Compressors increase the pressure on a fluid. As gases are compressible, the compressor also reduces the volume of a gas. A compressor stall is a local disruption of the airflow in a gas turbine or turbocharger compressor. Axi-symmetric stall, also known as compressor surge, is a breakdown in compression resulting in a reversal of flow and the violent expulsion of previously compressed gas out in the direction of the compressor intake. This condition is a result of the compressor's inability to continue working against the already-compressed gas behind it. As a result, the compressor may experience conditions that exceed its pressure rise capabilities, or the compressor may become loaded such that a flow reversal occurs, which can propagate in less than a second to include the entire compressor.

Once the compressor pressure ratio reduces to a level at which the compressor is capable of sustaining stable flow, the compressor will resume normal flow. If the conditions that induced the stall remains, the process can repeat. Repeating surge events can be dangerous, since they can cause high levels of vibration, compressor component wear and possible severe damage to compressor bearings, seals, impellers and shaft, including consequential loss of containment and explosion of hazardous gas.

SUMMARY

In general, this document discusses compressor protection systems.

In a first aspect, a method for detecting a compressor surge cycle includes receiving one or more surge value parameters, selecting a first value from a selected surge value parameter of the one or more surge value parameters, determining a moving average value for the selected surge value parameter, determining a rate of change value for the selected surge value parameter, identifying a first phase of a surge cycle based on determining that the rate of change value exceeds a threshold rate change value, memorializing the first value, the moving average value, and a first time index value, receiving a second value of the one or more surge value parameters, identifying a second phase of the surge cycle based on at least one of (1) determining that a first difference between the second value and the first value is at least equal to a first threshold difference value, and (2) determining that a second difference between the second value and the moving average value is at least equal to a second threshold difference value, receiving a third value of the selected surge value parameter, identifying a third phase of the surge cycle based on at least one of (1) determining that a third difference between the third value and the first value is less than the first difference, and that a fourth difference between the first difference and the third difference is at most equal to a third threshold difference value, and (2) determining that a fifth difference between the third value and the moving average value is less than the second difference, and that a sixth difference between the second difference and the fifth difference is at most equal to a fourth threshold difference value, and providing an indication that one or more compressor surge cycles have occurred.

Various implementations can include some, all, or none of the following features. Receiving one or more surge value parameters can include receiving one or more unfiltered surge value parameters, transforming the one or more unfiltered surge value parameters by a signal filter into one or more filtered surge value parameters, and providing the one or more filtered surge value parameters as the one or more surge value parameters. The one or more surge value parameters can be selected from a group of surge value parameters comprising: flow differential pressure, compressor suction pressure, compressor discharge pressure, compressor suction temperature, compressor rotational speed, and compressor prime mover power. The method can also include memorializing a time value representing a time at which the compressor surge cycle occurred. The method can also include determining, based on the time value, a quantity of one or more compressor surge cycles that have occurred within a threshold time period. The method can also include identifying a base surge value parameter from the one or more surge value parameters, identifying a non-base surge value parameter from the one or more surge value parameters, determining a base surge event separation time equal to a normal phase shift between the non-base surge value parameter and the base surge value parameter, determining that a surge cycle has occurred at a first time based on the base surge value parameter, determining that a surge cycle has occurred at a second time based on the non-base surge value parameter, determining a time difference between the first time and the second time, and determining that a validated surge cycle has occurred, based on determining that the time difference is at most a threshold time difference.

In a second aspect, a compressor protection system includes a data processing apparatus and a non-transitory memory storage storing instructions executable by the data processing apparatus. Upon such execution the instructions cause the data processing apparatus to perform operations comprising receiving one or more surge value parameters, selecting a first value from a selected surge value parameter of the one or more surge value parameters, determining a moving average value for the selected surge value parameter, determining a rate of change value for the selected surge value parameter, identifying a first phase of a surge cycle based on determining that the rate of change value exceeds a threshold rate change value, memorializing the first value, the moving average value, and a first time index value, receiving a second value of the selected surge value parameter, identifying a second phase of the surge cycle based on at least one of (1) determining that a first difference between the second value and the first value is at least equal to a first threshold difference value, and (2) determining that a second difference between the second value and the moving average value is at least equal to a second threshold difference value, receiving a third value of the selected surge value parameter, identifying a third phase of the surge cycle based on at least one of (1) determining that a third difference between the third value and the first value is less than the first difference, and that a fourth difference between the first difference and the third difference is at most equal to a third threshold difference value, and (2) determining that a fifth difference between the third value and the moving average value is less than the second difference, and that a sixth difference between the second difference and the fifth difference is at most equal to a fourth threshold difference value, and providing an indication that one or more compressor surge cycles have occurred.

Various embodiments can include some, all, or none of the following features. Receiving one or more surge value parameters can include receiving one or more unfiltered surge value parameters, transforming the one or more unfiltered surge value parameters by a signal filter into one or more filtered surge value parameters, and providing the one or more filtered surge value parameters as the one or more surge value parameters. The one or more surge value parameters can be selected from a group of surge value parameters comprising: flow differential pressure, compressor suction pressure, compressor discharge pressure, compressor suction temperature, compressor rotational speed, and compressor prime mover power. The operations can include memorializing a time value representing a time at which the compressor surge cycle occurred. The operations can also include determining, based on the time value, a quantity of one or more compressor surge cycles that have occurred within a threshold time period. The operations can also include identifying a base surge value parameter from the one or more surge value parameters, identifying a non-base surge value parameter from the one or more surge value parameters, determine a base surge event separation time equal to a normal phase shift between the non-base surge value parameter and the base surge value parameter, determine that a surge cycle has occurred at a first time based on the base surge value parameter, determine that a surge cycle has occurred at a second time based on the non-base surge value parameter, determine a time difference between the first time and the second time, and determine that a validated surge cycle has occurred, based on determining that the time difference is at most a threshold time difference.

The systems and techniques described herein may provide one or more of the following advantages. First, a system can recognize surge events in a dynamic compressor, validate a surge cycle, and count consecutive surge cycles. Second, the system can use one or more compressor parameters to perform surge detection when one or more other surge parameters are not available, or to supplement such other parameters. Third, the system can use signal filtering on a surge parameter to determine a rate of change of the surge parameter for surge detection without detecting nuisance surge events without adding phase lag to the raw signal of the surge parameter. Fourth, the system can detect the three phases of a surge cycle that validate occurrence of a full surge cycle (surge event). Fifth, the system can accurately count consecutive surge cycles without missing one or more surge cycles. Sixth, the system can accurately count consecutive surge cycles without double-counting the same surge cycle.

The details of one or more implementations are set forth in the accompanying drawings and the description below. Other features and advantages will be apparent from the description and drawings, and from the claims.

DETAILED DESCRIPTION

This document describes systems and techniques for identifying and responding to compressor surge events. In general, compressor surge events are identified by monitoring one or more compressor parameters to identify the occurrence of parameter waveforms that are characteristic of individual compressor surges. When the system identifies that a predetermined threshold number of compressor surges have occurred within a predetermined duration of time or at a predetermined frequency, then a compressor surge event is identified.

Generally speaking, surge cycle detection can be done by continuously monitoring a surge parameter and calculating its filtered value, moving average value, rate of change, and capturing and using the instances of the surge parameter and its calculated values at defined phases of surge detection cycle. A surge cycle detection routine generally consists of three consecutive phases, following one after another within a maximum time window $T_1$ (e.g., two seconds).

Phase 1: When the rate of change of a surge parameter exceeds a preset value, a time stamp $T_{A1}$ and the filtered value of the surge parameter value, the moving average value of surge parameter value, and/or the actual value of the surge parameter $X_{A1}$ may be memorialized and/or stored during this event.

Phase 2: When the instant value X of the surge parameter moves away either from $X_{A1}$ by greater than or equal to a predefined threshold amount $\Delta X_{in}$, or away from its filtered (moving average) value X' by greater than or equal to a predefined threshold amount $\Delta X'_{in}$.

Phase 3: When the instant value X of the surge parameter moves toward either $X_{A1}$ by less than or equal to a predefined threshold amount $\Delta X_{out}$, or toward its filtered (moving average) value X' by less than or equal of a predefined threshold amount $\Delta X'_{out}$.

Figure 1:
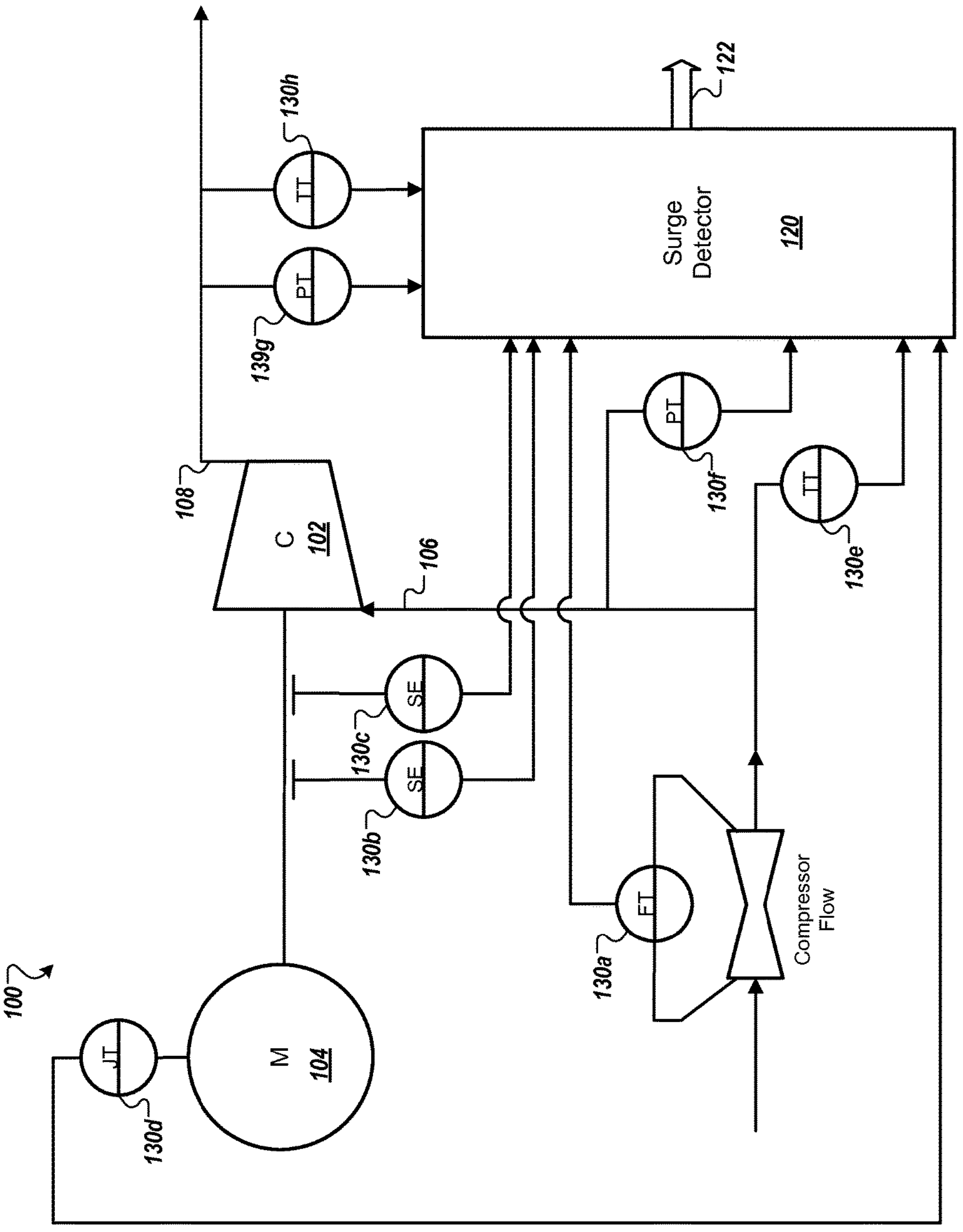
FIG. 1 is a schematic diagram that shows an example of a compressor system.

FIG. 1 is a schematic diagram that shows an example of a compressor system 100. The example compressor system 100 includes a compressor 102 driven by a motor 104 or other prime mover. The compressor 102 pressurizes a gas received at an inlet 106 (e.g., a suction port) and discharges the pressurized gas at a discharge 108 (e.g., an outlet port).

A surge detector 120 is configured to monitor either one or a plurality of a collection of surge parameter values. The surge parameter values are based on measurement signals received from a collection of system sensors and feedback devices. In the illustrated example, the surge detector 120 receives measurement signals from a flow sensor 130*a*, a rotational speed sensor 130*b*, a rotational speed sensor 130*c*, a motor power feedback sensor 130*d*, a suction temperature sensor 130*e*, a suction pressure sensor 130*f*, a discharge pressure sensor 130*g*, and a discharge temperature sensor 130*h*. In some embodiments, combinations of these and/or other sensors may be used, such as vibration sensors, discharge flow sensors, additional temperature sensors (e.g., motor temperature), load sensors (e.g., motor torque), and any other appropriate sensor or feedback device that can measure operating parameters of a compressor system.

In the example compressor system 100, the surge detector 120 monitors the sensors 130*a*-130*h* with a collection of circuits and/or operating instructions configured to identify surge parameter waveforms and the frequency of their occurrence. In general, the surge detector 120 counts the number of waveforms that occur within a predetermined interval of time (e.g., a frequency of occurrence), and if that count is greater than a predetermined threshold, then the surge detector 120 will provide a signal or other indication of a surge event at an output 122. For example, if the surge detector 120 detects three complete discharge pressure waveforms happening within a period of five seconds, then the surge detector 120 may determine that a surge event is occurring or has occurred and provide an indication of the event at the output 122. In some implementations, the output 122 may directly or indirectly control a safeguard operation. For example, the output 122 may trigger compressed gas at the discharge 108 to flow back to the inlet 106 through a controllable bypass valve to relieve the surge condition. In another example, the output 122 may trigger a controlled operational reduction or shutdown of the compressor system 100.

Figure 2A:
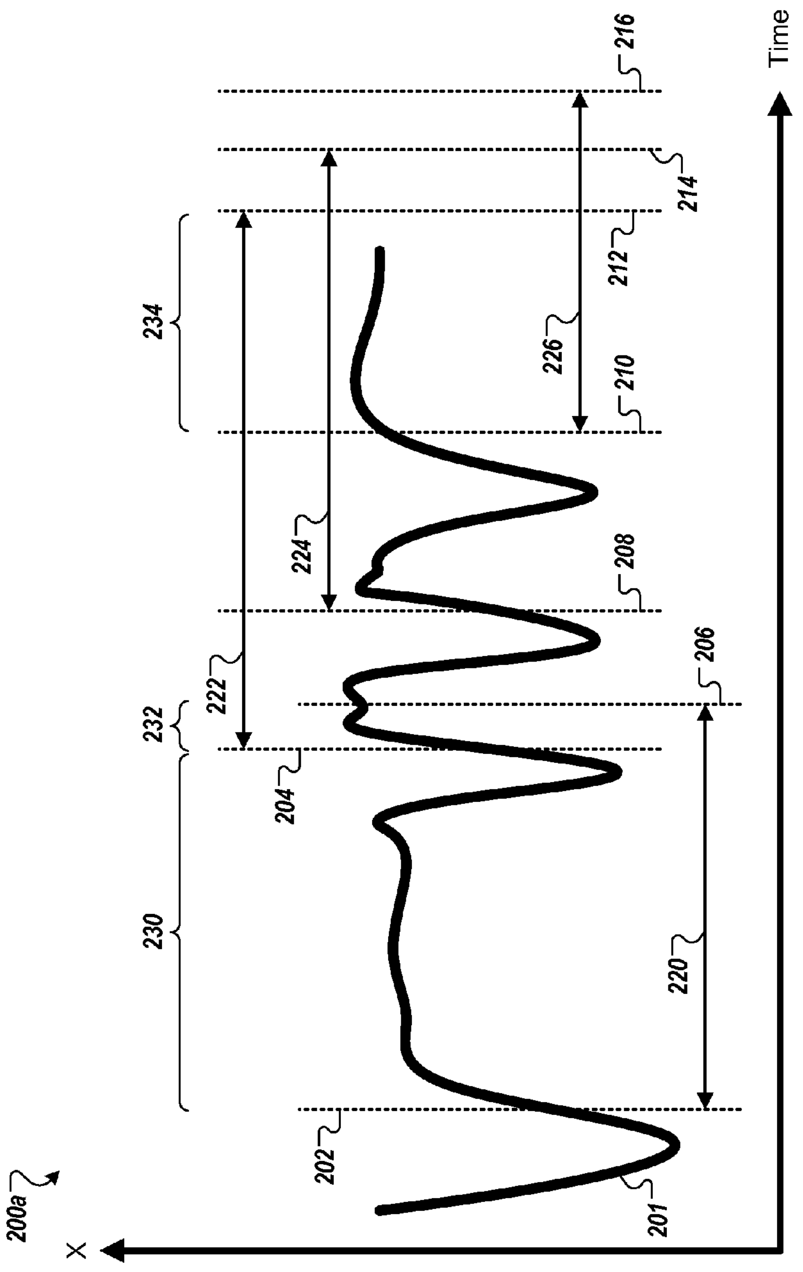
FIGS. 2A and 2B are charts of example compressor surge waveforms.
Figure 2B:
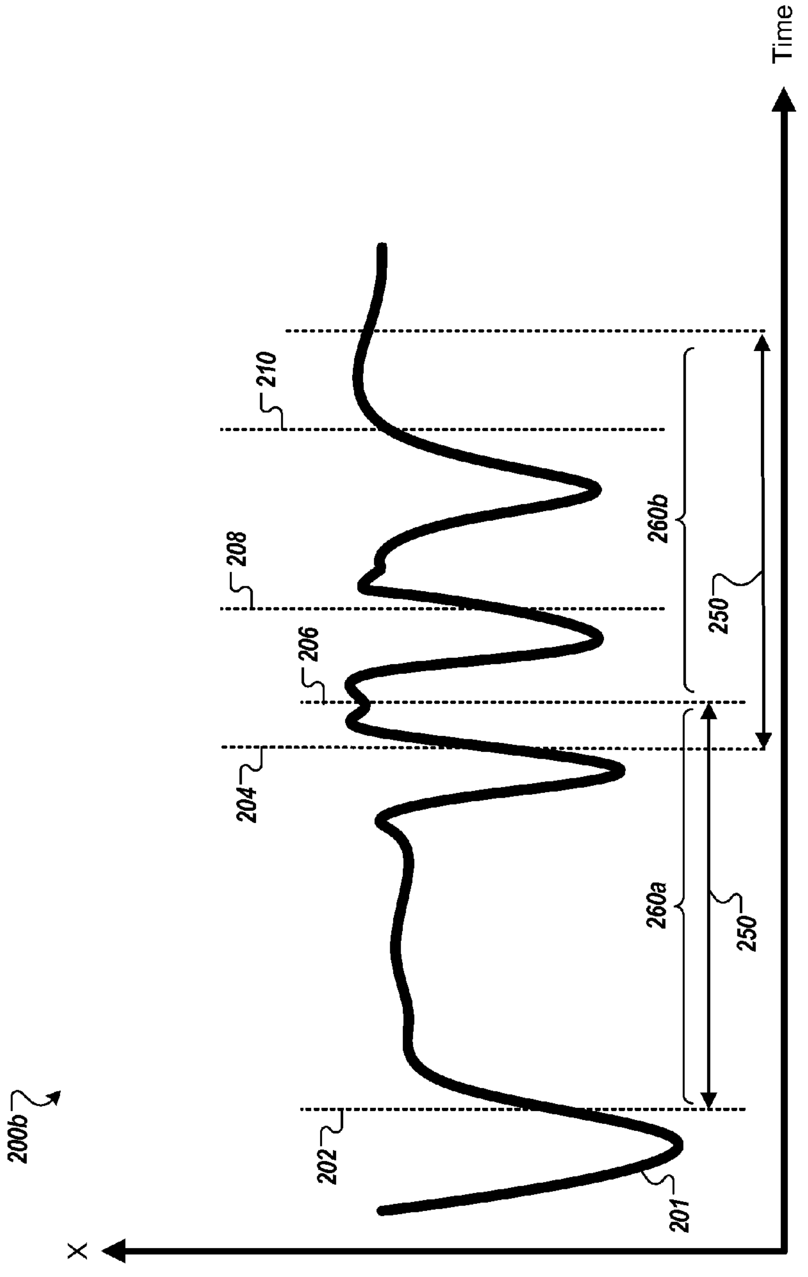

FIGS. 2A and 2B are charts of an example compressor surge waveform 201. In general, compressor rotational speed, suction pressure, suction temperature, and other parameters can be used as surge parameters for the detection of surge. Consecutive surge cycles are counted using analysis techniques that allow for counting substantially without missing one or more surge cycles, and further allow for accurately counting the consecutive surge cycles substantially without double-counting the same surge cycle.

Surge detection that can utilize a multitude of surge parameters, each individually and/or in any combination of such surge parameters. Parameter values that rise and fall during surge events can be measured as waveforms, and such waveforms can be analyzed to detect individual surge cycles.

Identified surge parameters can be typically increasing or decreasing in magnitude at the beginning of a surge cycle, and can be typically increasing or decreasing in magnitude at the end of a surge cycle. Several examples of surge parameters and typical behaviors are given in Table 1 below:

TABLE 1

| Surge Parameter | Typical Direction At The Beginning Of A Surge Cycle | Typical Direction At The End Of A Surge Cycle |
|---|---|---|
| Flow Differential Pressure | Decreasing | Increasing |
| Compressor Suction Pressure | Increasing | Decreasing |
| Compressor Discharge Pressure | Decreasing | Increasing |
| Compressor Suction Temperature | Increasing | Decreasing |
| Compressor Rotational Speed | Increasing | Decreasing |
| Compressor Prime Mover Power | Decreasing | Increasing |

For example, during a surge cycle measured flow differential pressure typically drops at the beginning of the surge cycle and rises again at the end of the surge cycle.

FIG. 2A shows a chart 200*a* of the example surge waveform 201 having a collection of consecutive surge cycles. In the illustrated example, individual time windows are started at the end (e.g., phase 3) of each detected surge cycle, and a consecutive surge danger (trip) alarm is produced when the number of consecutive cycles exceeds a predetermined number of surge cycles within a predefined time window.

At a time 202, the end of a first surge cycle in the waveform 201 is detected, and a time interval 220 is started and lasts until a time 206. At a time 204, the end of a second surge cycle in the waveform 201 is detected, and a time interval 222 is started and lasts until a time 212. At a time 208, the end of a third surge cycle in the waveform 201 is detected, and a time interval 224 is started and lasts until a time 214. At a time 210, the start of a fourth surge cycle in the waveform 201 is detected, and a time interval 226 is started and lasts until a time 214.

In the illustrated example, the threshold number of consecutive surge cycles is chosen to have a value of three. From time 202 to time 204, as indicated by a time interval 230, one time interval 220 is taking place. From time 204 to time 206, as indicated by a time interval 232, two time intervals 220 and 222 are taking place concurrently. From time 210 to time 212, as indicated by a time interval 234, three time intervals 222, 224, and 225 are taking place concurrently.

Since the threshold value of three is satisfied during the time interval 234, a consecutive surge danger (trip) alarm is identified starting at time 210. Although the predetermined number of concurrent time periods in this example is chosen to have a value of three, in other examples the predetermined number can be two, four, five, or any other appropriate number of concurrent time periods. In some implementations, a low predetermined threshold may be selected to minimize the chance that the system 100 will experience damage from compressor surge. For example, by identifying possible surge events quickly, remedial action may be taken before compressor damage occurs. In some implementations, a high predetermined threshold may be selected to increase the required amount of confidence that a surge event is happening before taking remedial action in the example compressor system 100. For example, by waiting until there is a greater confidence that a surge event is occurring before taking remedial action, the uptime of the compressor system 100 may be increased by reducing the frequency at which the compressive throughput of the example compressor system 100 may be at least partly reduced to remedy compressor surge conditions.

FIG. 2B shows a chart 200*b* of the example surge waveform 201 having a collection of consecutive surge cycles. In the illustrated example, a single moving time window 250 is used. A count of the number of surge cycle starts (e.g., conditions suggesting the end of a surge cycle) and a count of the number of surge cycle ends (e.g., conditions suggesting the completion of a surge cycle that started within the time window 250) within the time window 250 are taken. A difference between the number of surge starts and surge ends is determined, and a surge event is identified when the difference exceeds a predetermined threshold number.

In the illustrated example, when the moving time window 250 is at 260*a*, a surge cycle start is detected at 202 and another is detected at 204, for a total of two surge cycle starts and zero surge cycle ends during 260*a*. Since the difference between the number of starts (two) and ends (zero) is equal to two, the threshold value of three has not been satisfied and no surge event is identified for the time interval at 260*a*. When the moving time window 250 is at 260*b*, a surge cycle start is detected at 204, another at 208, and another at 210, for a total of three starts. The surge cycle end at 206 is not counted since it is the end of a cycle that started at a time outside of the time window 250. As such, there are three starts and zero ends, resulting in a difference of three. Since the difference is at least equal to the predetermined threshold value of three, a surge event is identified starting at 210. In some implementations, the start of the surge event may be applied retroactively, for example, starting at 204.

In some implementations, signal filtering may be applied to surge parameters in order to promote the use of rate of change measurements of surge parameters for surge detection. For example, filtering can be used to reduce signal noise that can include high-frequency waveforms that can resemble but not actually indicate surge cycles. By filtering out such noise, the number of falsely identified surge events can be reduced substantially without adding unacceptable amounts of phase lag to the raw signals of surge parameters.

Figure 3A:
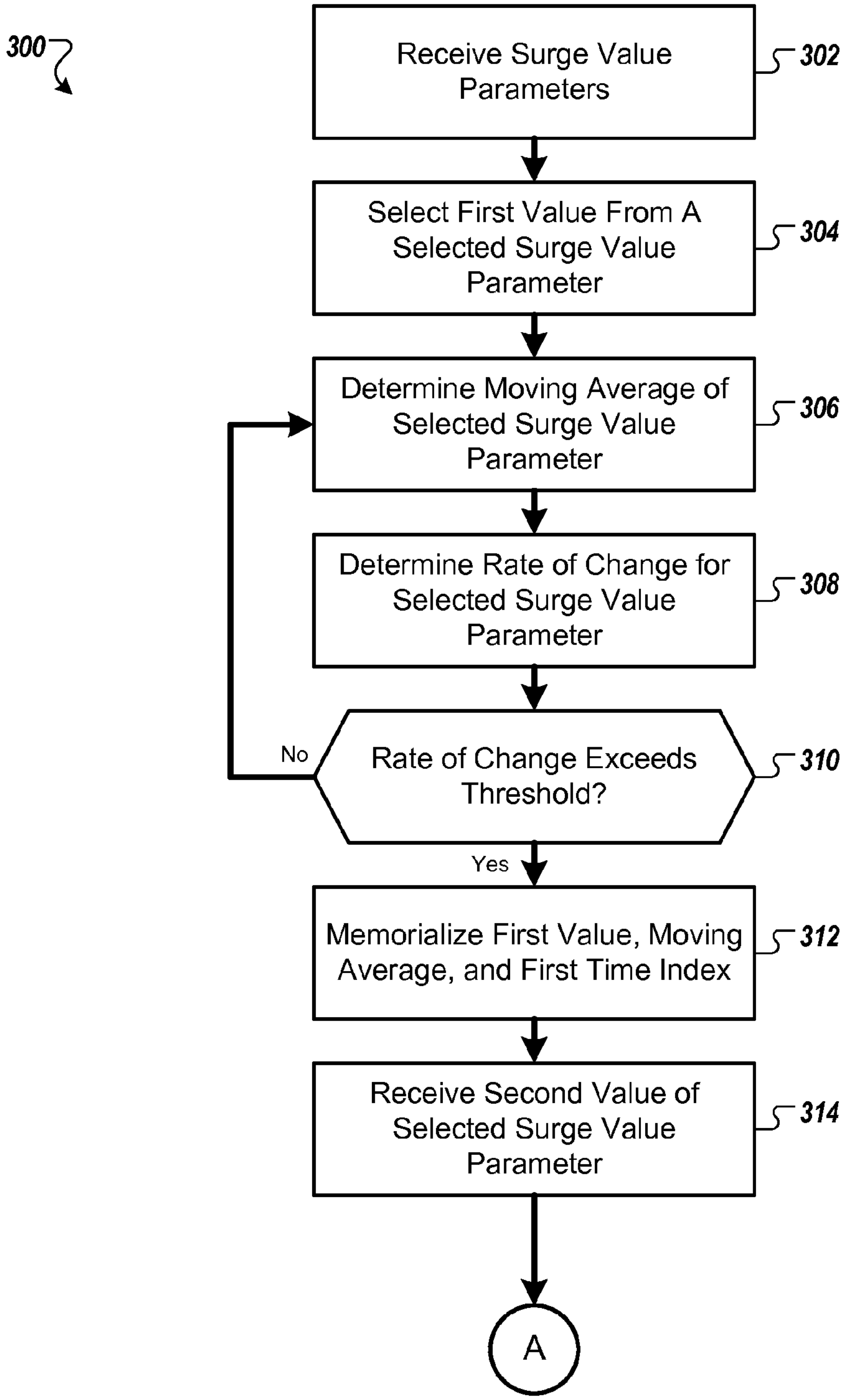
FIGS. 3A and 3B are flow charts that show an example of a process for counting compressor surge cycles.
Figure 3B:
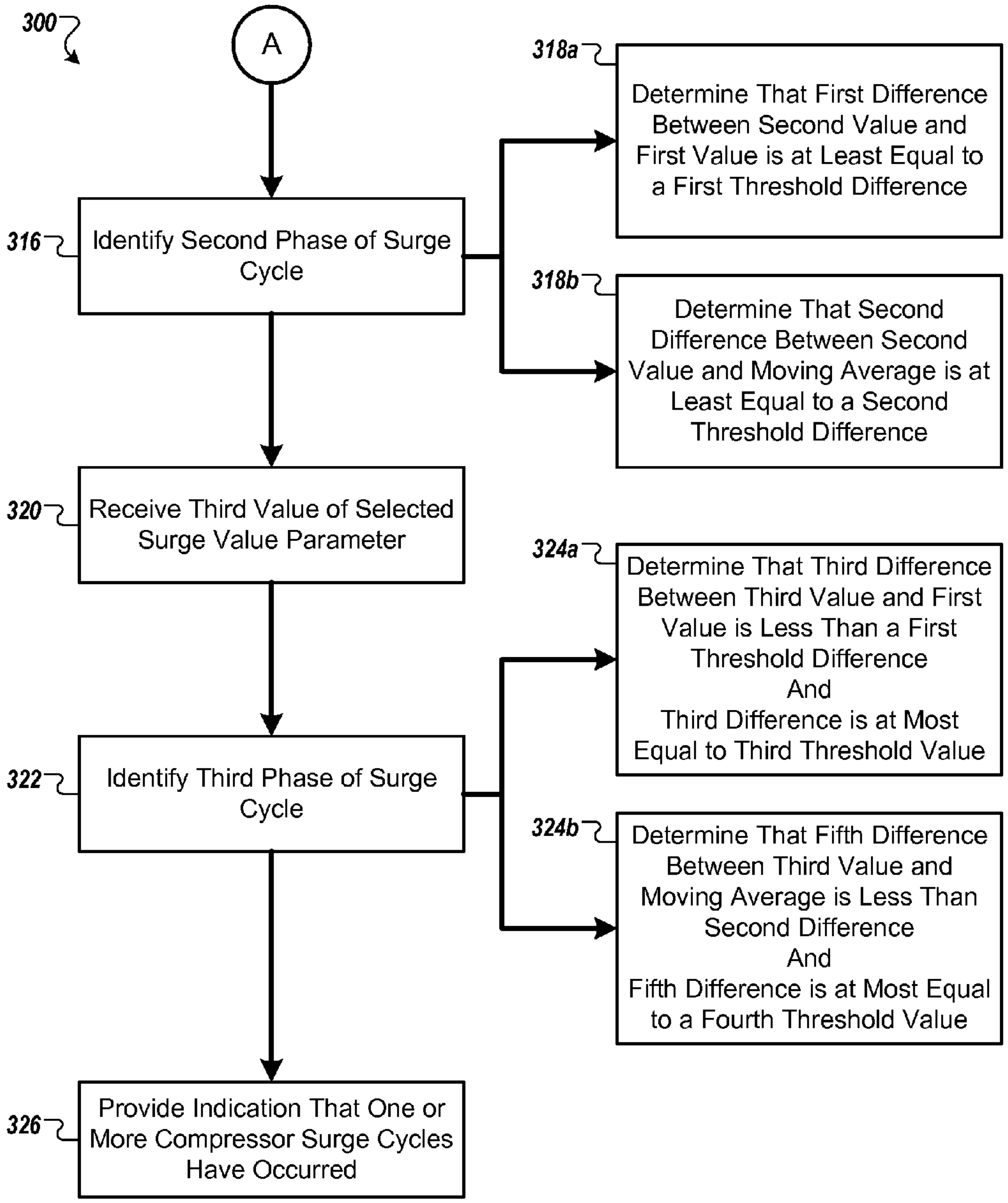

FIGS. 3A and 3B are flow charts that show an example of a process 300 for counting compressor surge cycles. The process 300 may be performed, for example, by a system such as the example compressor system 100 of FIG. 1. For clarity of presentation, the description that follows uses the example compressor system 100 as an example for describing the process 300. However, another system, or combination of systems, may be used to perform the process 300.

At 302, one or more surge value parameters are received. For example, the surge detector 120 of the example compressor system 100 of FIG. 1 can receive surge value parameters as measurements based on feedback from the sensors 130*a*-130*h*.

At 304, a first value is selected from a selected surge value parameter of the one or more surge value parameters. For example, a selection can be made by the surge detector 120 from one or more of feedback signals provided by the sensors 130*a*-130*h*, that represent parameters such as flow differential pressure, compressor suction pressure, compressor discharge pressure, compressor suction temperature, compressor rotational speed, compressor prime mover power, or combinations of these and/or any other appropriate representation of compressor system conditions. The surge detector 120 can take one or more measurements based on the selection.

At 306 a moving average value is determined for the selected surge value parameter. For example, the surge detector 120 can calculate a moving average for a series of measurements taken from the selected sensor 130*a*-130*h*. In some implementations, the moving average value for the selected surge value parameter may be periodically or continuously updated.

At 308, a rate of change value is determined for the selected surge value parameter. For example, the surge detector 120 can determine how fast the selected sensor reading is rising or falling.

At 310, a determination is made. If at 310, the rate of change value does not exceed a threshold rate change value, then the process 300 continues monitoring the moving average at 306 and the rate of change at 308. For example, if the flow differential pressure increases slowly (e.g., less than a 1 psig/sec threshold), then the surge detector 120 will continue monitoring the pressure. If at 310, the rate of change value exceeds the threshold rate change value, then the first value, the moving average value, and a first time index value are memorialized at 312. For example, if the flow differential pressure increases rapidly (e.g., 1 psig/sec or more), then the surge detector 120 will log that measurement along with a time stamp since this condition may be a precursor to a surge cycle.

At 314 a second value of the selected surge value parameter is received. For example, after the first value is memorialized, the surge detector 120 can continue monitoring and receiving values from the selected one of sensors 130*a*-130*h* and other parameters.

Referring now to FIG. 3B, at 316 a second phase of the surge cycle identified. The identification is based on at least one of two determinations being made. At 318*a*, a determination that a first difference between the second value and the first value is at least equal to a first threshold difference value is made. For example, the surge detector 120 can determine the difference between a memorialized sensor reading and a current reading of the same sensor, and compare the difference to a predetermined trigger threshold value. The comparison can evaluate to a logical "true" if the difference satisfies the threshold (e.g., the sensor reading has changed "enough" to be used for further surge detection processes). At 318*b*, a determination that a second difference between the second value and the moving average value is at least equal to a second threshold difference value is made. For example, the surge detector 120 can determine the difference between the moving average of a sensor reading and a current reading of the same sensor, and compare the difference to a predetermined trigger threshold value. The comparison can evaluate to a logical "true" if the difference satisfies the threshold (e.g., the live sensor reading has deviated "enough" from the moving average to be used for further surge detection processes). If one or both of steps 318*a* and 318*b* are true, then a second phase of the surge cycle is identified at 316.

At 320, a third value of the selected surge value parameter is received. For example, after the second phase cycle is identified, the surge detector 120 can continue monitoring and receiving values from the selected one of sensors 130*a*-130*h* and other parameters.

At 322, a third phase of the surge cycle identified. The identification is based on at least one of two determinations being made. At 324*a*, a determination is made that a third difference between the third value and the first value is less than the first difference, and a fourth difference between the first difference and the third difference is at most equal to a third threshold difference value. For example, the surge detector 120 can determine that the selected sensor reading has peaked or bottomed out and is trending back toward the moving average value, and compare how far the current value has moved away from the peak/valley to a predetermined trigger threshold value. The comparison can evaluate to a logical "true" if the difference satisfies the threshold (e.g., the current sensor reading has come off an extrema relative to the memorialized reading but still remains within a predetermined range of the extrema). At 318*b*, a determination is made that a fifth difference between the third value and the moving average value is less than the second difference and that a sixth difference between the second difference and the fifth difference is at most equal to a fourth predetermined threshold difference value. For example, the surge detector 120 can determine the fifth difference as the difference between the moving average of a sensor reading and a current reading of the same sensor, and compare the difference to the second difference. The second difference and the fifth difference are then compared to determine the sixth difference. The comparison can evaluate to a logical "true" if the difference satisfies the threshold (e.g., the current sensor reading has come off an extrema relative to the moving average but still remains within a predetermined range of the extrema). If one or both of steps 324*a* and 324*b* are true, then a third phase of the surge cycle is identified at 316.

An indication that one or more compressor surge cycles have occurred is provided at 326. For example, having identified all three phases of a surge cycle, the surge detector 120 can determine that a surge cycle (e.g., a surge waveform cycle) has occurred. In some implementations, the surge detector 120 can provide the indication that one or more compressor surge cycles have occurred at the output 122.

In some implementations, the process 300 can include memorializing a time value representing a time at which the compressor surge cycle occurred. In some implementations, the process 300 can include determining, based on the time value of each of the one or more compressor surge cycles, a quantity of the one or more compressor surge cycles that have occurred within a threshold time period. For example, the surge detector 120 may be configured to provide an indication at the output 122 only after a predetermined number (e.g., two, three, four, five or some other number) of surge cycles have been identified within a predetermined length of time (e.g., one second, five seconds, ten seconds, thirty seconds, one minute, or some other length of time).

In some implementations, a pair of surge parameters may be used to detect and count consecutive surge cycles. For example, the two or more surge parameters may be used simultaneously. Two or more surge parameters may produce surge cycle signatures, but a surge cycle may be counted only when two or more of the surge parameters have produced such signatures within a predefined time of each other. This technique can be used in some examples to ensure that each surge cycle is counted only once.

In some implementations, a surge cycle may be identified by identifying a base surge value parameter from the one or more surge value parameters, identifying a non-base surge value parameter from the one or more surge value parameters, determine a base surge event separate time equal to a normal phase shift between the non-base surge value parameter and the base surge value parameter, determining that a surge cycle has occurred at a first time based on the base surge value parameter, determining that a surge cycle has occurred at a second time based on the non-base surge value parameter, determining a time difference between the first time and the second time and determining that a validated complete surge cycle has occurred, based on determining that the time difference is at most a threshold time difference.

For example, a base surge parameter (e.g., a relatively dynamic parameter) can be selected. For each non-base surge parameter X, a base surge event separation time $\Delta t^{Xb}$ can be established, the event separation time interval being equal to a normal phase shift between the non-base surge parameter and the base parameter. The detection of a surge cycle can then be validated using the base surge parameter. For each non-base surge parameter X, a respective surge cycle validation time window timer Tx can be initiated, with a $\Delta t^{Xb}$ shift relative to phase. If detection of a surge cycle through the non-base parameter is validated within its respective validation time window $\Delta t^{X}$, then one cycle may be counted, otherwise no surge cycle may be counted.

In some implementations, counting consecutive surge cycles may be performed using the following steps. A separate consecutive surge cycle timer of a predetermined number of timers may be initiated for each new surge cycle detected. Additionally, a separate consecutive surge cycle counter may be initiated for each new surge cycle detected. Each timer may be reset after timing out and then reinitialized after the timer with the proceeding number has already been initiated (e.g., round-robin reuse of the finite collection of timers). Each counter may be reset when either its respective timer times out or its accumulated value has reached a predetermined threshold set point. If all the timers are active at once, a consecutive surge danger event may be declared and an alarm or other output may be provided. In some implementations, the total consecutive surge count that can produce an alarm or action may not be allowed to exceed four, in which case the use of three timers and three counters may be sufficient.

In some implementations, counting consecutive surge cycles may be performed using the following steps. Upon detection of a first surge cycle, a consecutive surge cycle detection timer T1 may be initialized with a preset value of Tx seconds and a single counter may be initialized with a preset value of Cx counts. A time stamp t1 may be captured for the first surge cycle. A time stamp t2 may be captured for a second surge cycle. The time difference ΔT can be determined for each pair of consecutive cycles (e.g., $\Delta T_2$=t2−t1). If the timer T1 times out before the consecutive surge counter reaches its preset threshold value, the same timer may be reinitialized with the value of $\Delta T_2$. The accumulated value of the consecutive surge count can then be reduced by 1. This general process is then repeated for new surge cycles by capturing their time stamps, calculating time differences between each consecutive pair of cycles, and reducing the accumulated consecutive surge count by 1 with each new cycle until either the surge counter reaches its preset value or no new cycles are detected within the T1 time window.

Figure 4:
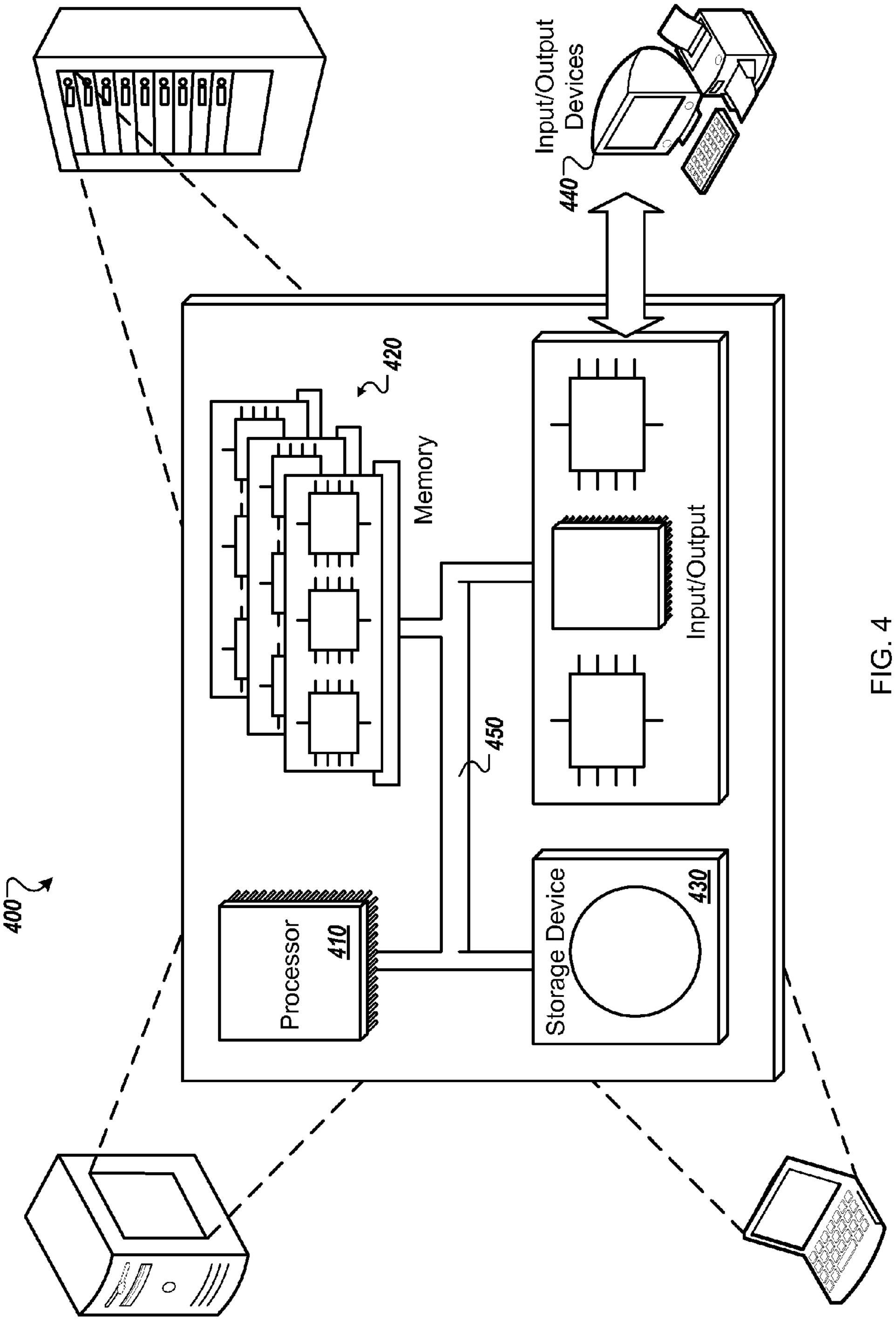
FIG. 4 is a schematic diagram of an example of a generic computer system.

FIG. 4 is a schematic diagram of an example of a generic computer system 400. The system 400 can be used for the operations described in association with the method 300 according to one implementation. For example, the system 400 may be included in the example surge detector 120 of FIG. 1.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them.

The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for detecting a compressor surge cycle of a compressor, comprising:

receiving, at a surge detector and from one or more feedback devices, one or more measurement signals of a compressor;

determining, by the surge detector, one or more surge value parameters based on the one or more measurement signals;

selecting, by the surge detector, a first value from a selected surge value parameter of the one or more surge value parameters;

determining, by the surge detector, a moving average value for the selected surge value parameter;

determining, by the surge detector, a rate of change value for the selected surge value parameter;

identifying, by the surge detector, a first phase of a surge cycle based on determining that the rate of change value exceeds a threshold rate change value;

memorializing, by the surge detector, the first value, the moving average value, and a first time index value;

determining, by the surge detector, a second value of the selected surge value parameter;

identifying, by the surge detector, a second phase of the surge cycle based on the identification of the first phase and at least one of (1) determining, by the surge detector, that a first difference between the second value and the first value is at least equal to a first threshold difference value, and (2) determining, by the surge detector, that a second difference between the second value and the moving average value is at least equal to a second threshold difference value;

determining, by the surge detector, a third value of the selected surge value parameter;

identifying, by the surge detector, a third phase of the surge cycle based on the identification of the second phase and at least one of (1) determining, by the surge detector, that a third difference between the third value and the first value is less than the first difference, and that a fourth difference between the first difference and the third difference is at most equal to a third threshold difference value, and (2) determining, by the surge detector, that a fifth difference between the third value and the moving average value is less than the second difference, and that a sixth difference between the second difference and the fifth difference is at most equal to a fourth threshold difference value;

providing, by the surge detector and in response to the identification of the third phase, an indication that one or more compressor surge cycles have occurred; and activating, based on the indication, a safeguard operation for the compressor.

2. The method of claim 1, wherein determining one or more surge value parameters further comprises:

receiving one or more unfiltered surge value parameters;

transforming the one or more unfiltered surge value parameters by a signal filter into one or more filtered surge value parameters; and providing the one or more filtered surge value parameters as one or more surge value parameters.

3. The method of claim 1, wherein the one or more surge value parameters are selected from a group of surge value parameters comprising: flow differential pressure, compressor suction pressure, compressor discharge pressure, compressor suction temperature, compressor rotational speed, and compressor prime mover power.

4. The method of claim 1, further comprising memorializing a time value representing a time at which the compressor surge cycle occurred.

5. The method of claim 4, further comprising determining, based on the time value, a quantity of one or more compressor surge cycles that have occurred within a threshold time period.

6. The method of claim 1, further comprising:

identifying a base surge value parameter from the one or more surge value parameters;

identifying a non-base surge value parameter from the one or more surge value parameters;

determining a base surge event separation time equal to a normal phase shift between the non-base surge value parameter and the base surge value parameter;

determining that a surge cycle has occurred at a first time based on the base surge value parameter;

determining that a surge cycle has occurred at a second time based on the non-base surge value parameter;

determining a time difference between the first time and the second time; and determining that a validated surge cycle has occurred, based on determining that the time difference is at most a threshold time difference.

7. A compressor protection system comprising:

a data processing apparatus; and a non-transitory memory storage storing instructions executable by the data processing apparatus and that upon such execution cause the data processing apparatus to perform operations comprising:

receiving one or more measurement signals of a compressor from one or more feedback devices;

determining one or more surge value parameters based on the one or more measurement signals;

selecting a first value from a selected surge value parameter of the one or more surge value parameters;

determining a moving average value for the selected surge value parameter;

determining a rate of change value for the selected surge value parameter;

identifying a first phase of a surge cycle based on determining that the rate of change value exceeds a threshold rate change value;

memorializing the first value, the moving average value, and a first time index value;

receiving a second value of the selected surge value parameter;

identifying a second phase of the surge cycle based on the identification of the first phase and at least one of (1) determining that a first difference between the second value and the first value is at least equal to a first threshold difference value, and (2) determining that a second difference between the second value and the moving average value is at least equal to a second threshold difference value;

receiving a third value of the selected surge value parameter;

identifying a third phase of the surge cycle based on the identification of the second phase and at least one of (1) determining that a third difference between the third value and the first value is less than the first difference, and that a fourth difference between the first difference and the third difference is at most equal to a third threshold difference value, and (2) determining that a fifth difference between the third value and the moving average value is less than the second difference, and that a sixth difference between the second difference and the fifth difference is at most equal to a fourth threshold difference value;

providing, in response to identification of the third phase, an indication that one or more compressor surge cycles have occurred; and activating, based on the indication, a safeguard for the compressor.

8. The compressor protection system of claim 7, wherein determining one or more surge value parameters further comprises:

receiving one or more unfiltered surge value parameters;

transforming the one or more unfiltered surge value parameters by a signal filter into one or more filtered surge value parameters; and providing the one or more filtered surge value parameters as the one or more surge value parameters.

9. The compressor protection system of claim 7, wherein the one or more surge value parameters are selected from a group of surge value parameters comprising: flow differential pressure, compressor suction pressure, compressor discharge pressure, compressor suction temperature, compressor rotational speed, and compressor prime mover power.

10. The compressor protection system of claim 7, the operations further comprising memorializing a time value representing a time at which the compressor surge cycle occurred.

11. The compressor protection system of claim 10, the operations further comprising determining, based on the time value, a quantity of one or more compressor surge cycles that have occurred within a threshold time period.

12. The compressor protection system of claim 7, the operations further comprising:

identifying a base surge value parameter from the one or more surge value parameters;

identifying a non-base surge value parameter from the one or more surge value parameters;

determine a base surge event separation time equal to a normal phase shift between the non-base surge value parameter and the base surge value parameter;

determine that a surge cycle has occurred at a first time based on the base surge value parameter;

determine that a surge cycle has occurred at a second time based on the non-base surge value parameter;

determine a time difference between the first time and the second time; and determine that a validated surge cycle has occurred, based on determining that the time difference is at most a threshold time difference.

* * * * *